United States Patent
Kawasaki et al.

(10) Patent No.: US 6,530,271 B2
(45) Date of Patent: Mar. 11, 2003

(54) APPARATUS AND METHOD FOR DETECTING DECREASE IN AIR-PRESSURE FOR USE IN TWO-WHEELED VEHICLE, AND PROGRAM FOR JUDGING DECOMPRESSION FOR USE IN TWO-WHEELED VEHICLE

(75) Inventors: Hiroaki Kawasaki, Kobe (JP); Yukio Nakao, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/174,966

(22) Filed: Jun. 20, 2002

(65) Prior Publication Data

US 2002/0194904 A1 Dec. 26, 2002

(30) Foreign Application Priority Data

Jun. 20, 2001 (JP) .................................. 2001-186938

(51) Int. Cl.$^7$ ............................................... B60C 23/02
(52) U.S. Cl. ....................................................... 73/146.2
(58) Field of Search .................................. 73/146, 146.2, 73/146.3, 146.5; 340/448, 441, 442, 443, 444, 445, 446, 447; 701/36, 38, 39, 65; 702/70

(56) References Cited

U.S. PATENT DOCUMENTS

| | | | | |
|---|---|---|---|---|
| 4,955,448 A | * | 9/1990 | Ise et al. | 180/197 |
| 5,826,210 A | * | 10/1998 | Izumi et al. | 340/444 |
| 5,900,543 A | * | 5/1999 | Oshiro | 340/444 |
| 6,137,400 A | * | 10/2000 | Yanase et al. | 340/442 |
| 6,420,966 B2 | * | 7/2002 | Sugisawa | 340/441 |

FOREIGN PATENT DOCUMENTS

| | | |
|---|---|---|
| JP | 63 305011 | 12/1988 |
| JP | 09 066714 | 3/1997 |
| JP | 09 104209 | 4/1997 |
| JP | 09 104210 | 4/1997 |

\* cited by examiner

Primary Examiner—William Oen
(74) Attorney, Agent, or Firm—Birch, Stewart, Kolasch & Birch, LLP

(57) ABSTRACT

An apparatus for detecting decrease in air-pressure for use in a two-wheeled vehicle including: a wheel speed detecting means for detecting wheel speeds; an acceleration calculating means for obtaining accelerations of a vehicle body of the two-wheeled vehicle; a slip rate calculating means for calculating slip rates when the acceleration of the vehicle body is in a specified range which is proximate to zero; an average value calculating means for obtaining average values of the slip rates and average vehicle body speeds; a difference calculating means for obtaining differences between the average values of the slip rates and a reference value which is based on an average vehicle body speed as preliminarily set when an internal pressure is normal; and a means for judging decrease in internal pressure. A decrease in air-pressure in a two-wheeled vehicle can be judged so as to enable safe driving.

3 Claims, 5 Drawing Sheets

APPARATUS AND METHOD FOR DETECTING DECREASE IN AIR-PRESSURE FOR USE IN TWO-WHEELED VEHICLE, AND PROGRAM FOR JUDGING DECOMPRESSION FOR USE IN TWO-WHEELED VEHICLE

BACKGROUND OF THE INVENTION

The present invention relates to an apparatus and method for detecting decrease in air-pressure for use in a two-wheeled vehicle as well as to a program for judging decompression for use in a two-wheeled vehicle. More particularly, it relates to an apparatus and method for detecting decrease in air-pressure for use in a two-wheeled vehicle and a program for judging decompression for use in a two-wheeled vehicle for judging a decrease in air-pressure of a tire especially designed for two-wheeled vehicles and for accordingly alarming a driver thereof.

Conventional apparatuses for alarming decrease in tire air-pressure can be roughly divided into direct detecting type apparatuses in which pressure sensors are mounted to tire valves for detecting air-pressures thereof and those of indirect methods in which decompression is judged on the basis of rotational velocity information of the wheels.

While the directed detecting type apparatuses are advantaged in that they are capable of informing absolute pressure values, they are simultaneously disadvantaged in that costs involved will be remarkably high owing to the fact that pressure sensors, transmitters and receivers are required.

On the other hand, while apparatuses of the indirect method cannot provide absolute pressure values, they are capable of exhibiting the merit of remarkably low costs involved due to which reason they are employed by many automobile manufactures. One example of such apparatuses of indirect method is disclosed in Japanese Unexamined Patent Publication No. 305011/1988. Such an apparatus is for detecting decrease in air-pressure of a tire on the basis of relative changes in wheel speeds, and judgments are performed through variations in the following judged values (DEL) which might be calculated on the basis of the wheel speeds:

$$DEL=\{(V1+V4)/2-(V2+V3)/2\}/\{(V1+V2+V3+V4)/4\}\times 100(\%)$$

Here, V1, V2, V3 and V4 respectively denote wheel speeds of a tire of the front left wheel, a tire of the front right wheel, a tire of the rear left wheel and a tire of the rear right wheel.

The apparatus as disclosed in the above Japanese Unexamined Patent Publication No. 305011/1988 utilizes the fact that a decrease in internal pressure of a tire results in a decrease in the dynamic load of the tire whereupon the rotational number of only the tire in question is increased to thus lead to an increase in the above judged value, and upon obtaining a difference between a sum of one group of diagonally located tires and a sum of the other group of diagonally located tires, it is possible to eliminate influences of slip rates of front and rear wheels.

While a decrease in internal pressure can be detected on the basis of variations of such judged values in the case of a four-wheeled vehicle, in the case of a two-wheeled vehicle, a decrease in internal pressure can not at all be detected by merely watching the ratio of rotational numbers of the front and rear wheels since no diagonal sums can be obtained as with four-wheeled vehicles.

This is due to the fact that the ratio of rotational numbers of the front and rear tire, that is, a slip rate is largely varied in accordance with running conditions even though no changes in the internal pressure of the tire occur. The slip rate might vary by 10% and more especially when performing acceleration or deceleration. On the other hand, even a decrease of 30% present in the internal pressure of the tire only results in an increase of the rotational number of several % so that a decrease in internal pressure cannot be detected by watching the ratio of front and rear wheels alone.

SUMMARY OF THE INVENTION

The present invention has been made in view of these facts, and it is an object thereof to provide an apparatus and a method for detecting decrease in tire air-pressure for use in a two-wheeled vehicle and a program for judging decompression for use in a two-wheeled vehicle capable of judging a decrease in air-pressure of a tire of a two-wheeled vehicle for ensuring safe driving.

In accordance with the present invention, there is provided an apparatus for detecting decrease in air-pressure for use in a two-wheeled vehicle, including: a wheel speed detecting means for detecting wheel speeds of a front and a rear wheel of a two-wheeled vehicle; an acceleration calculating means for obtaining accelerations of a vehicle body of the two-wheeled vehicle; a slip rate calculating means for calculating slip rates when the acceleration of the vehicle body is in a specified range which is proximate to zero; an average value calculating means for obtaining average values of the slip rates and average vehicle body speeds in case the accelerations of the vehicle body have continued to be in the specified range which is proximate to zero for a specified period of time; a difference calculating means for obtaining differences between the average values of the slip rates and a reference value which is based on an average vehicle body speed as preliminarily set when an internal pressure is normal; and a means for judging decrease in internal pressure for judging that the internal pressure is decrease in case an average value of a specified number of the differences does not fall within a range of a preliminarily set threshold.

In accordance with the present invention, there is also provided a method for detecting decrease in air-pressure for use in a two-wheeled vehicle, including the steps of: detecting wheel speeds of a front and a rear wheel of a two-wheeled vehicle; obtaining accelerations of a vehicle body of the two-wheeled vehicle; calculating slip rates when the acceleration of the vehicle body is in a specified range which is proximate to zero; obtaining average values of the slip rates and average vehicle body speeds in case the accelerations of the vehicle body have continued to be in the specified range which is proximate to zero for a specified period of time; obtaining differences between the average values of the slip rates and a reference value which is based on an average vehicle body speed as preliminarily set when an internal pressure is normal; and judging that the internal pressure is decrease in case an average value of a specified number of the differences does not fall within a range of a preliminarily set threshold.

In accordance with the present invention, there is further provided a program for judging decompression for use in a two-wheeled vehicle so arranged that a computer is made to function as a wheel speed detecting means for detecting wheel speeds of a front and a rear wheel of a two-wheeled vehicle; an acceleration calculating means for obtaining accelerations of a vehicle body of the two-wheeled vehicle; a slip rate calculating means for calculating slip rates when the acceleration of the vehicle body is in a specified range which is proximate to zero; an average value calculating means for obtaining average values of the slip rates and average vehicle body speeds in case the accelerations of the vehicle body have continued to be in the specified range which is proximate to zero for a specified period of time; a difference calculating means for obtaining differences between the average values of the slip rates and a reference value which is based on an average vehicle body speed as preliminarily set when an internal pressure is normal; and a means for determining decrease in internal pressure for judging that the internal pressure is decrease in case an average value of a specified number of the differences does not fall within a range of a preliminarily set threshold.

DETAILED DESCRIPTION

The apparatus and method for detecting decrease in air-pressure for use in a two-wheeled vehicle and the program for judging decompression in a two-wheeled vehicle of the present invention will now be explained with reference to the accompanying drawings.

Figure 1:
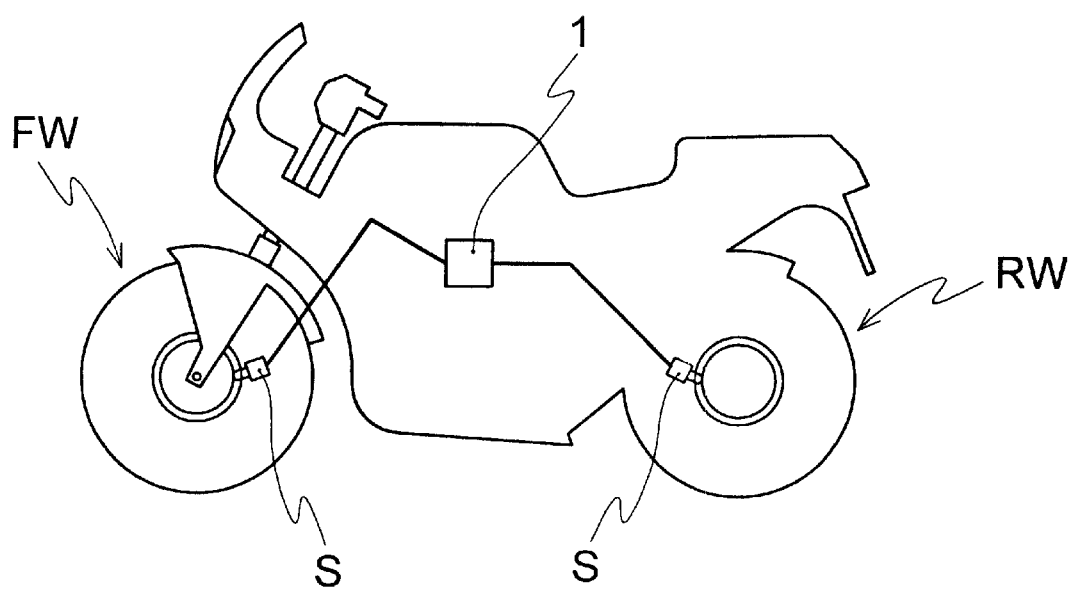
FIG. 1 is a block diagram illustrating one embodiment of an apparatus for detecting decrease in air-pressure for use in a two-wheeled vehicle according to the present invention.

As illustrated in FIG. 1, a two-wheeled automobile according to the present embodiment includes a wheel speed detecting means S for periodically detecting rotational velocities of tires of a front wheel FW and a rear wheel RW. The wheel speed detecting means S might be a wheel speed sensor for generating rotational pulses by using an electromagnetic pickup or similar and accordingly measuring rotational velocities on the basis of the number of pulses. Outputs of the of the wheel speed detecting means S are input to a control unit 1 such as an ABS. Pulse signals corresponding to the rotational number of the tire Wi (hereinafter referred to as "wheel speed pulse") are accordingly output.

Figure 2:
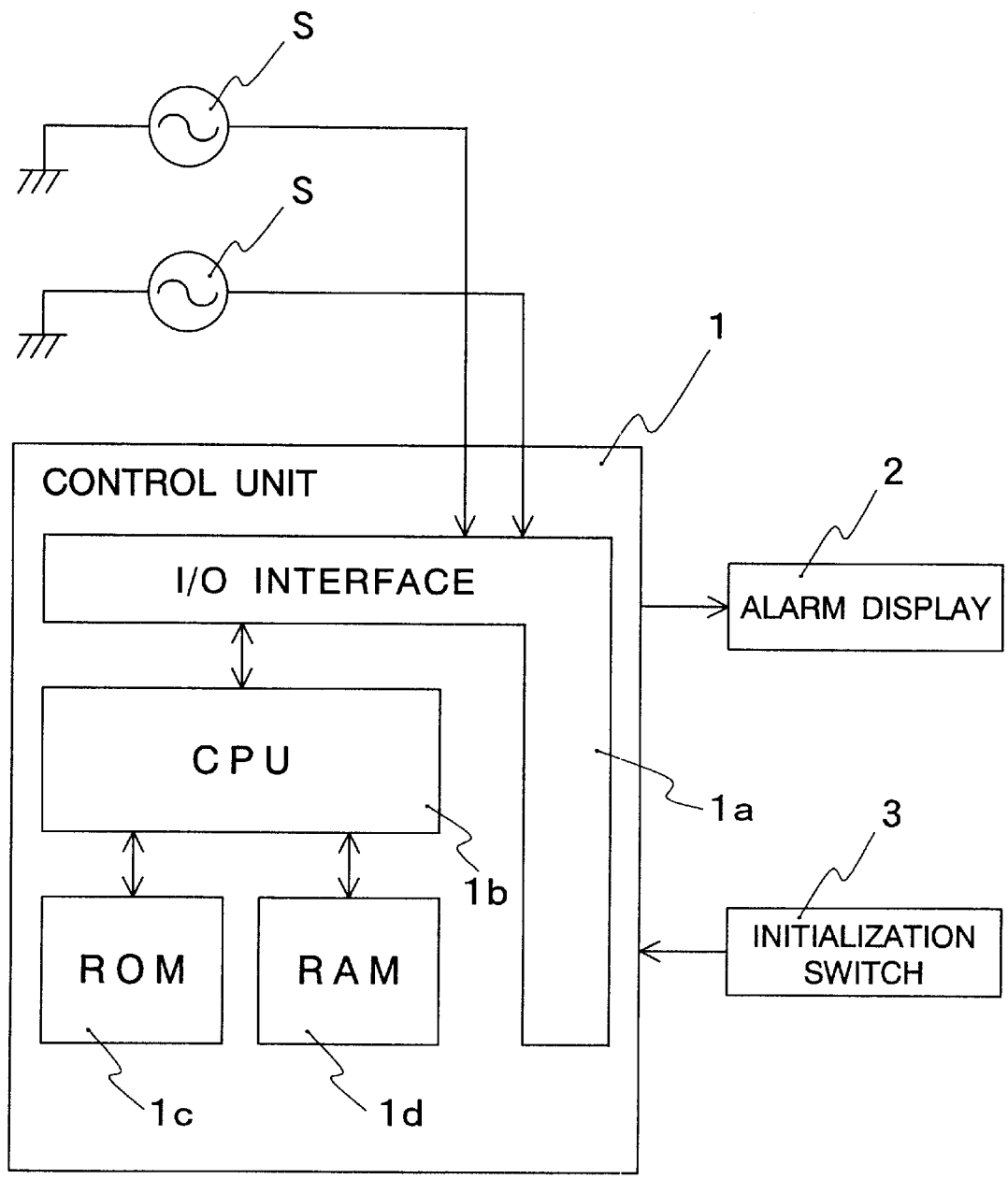
FIG. 2 is a block diagram illustrating the apparatus for detecting decrease in air-pressure for use in a two-wheeled vehicle according to the present invention.

As illustrated in FIG. 2, the control unit 1 comprises an I/O interface 1a required for sending/receiving signals to/from an external device, a CPU 1b which functions as a center of calculation, a ROM 1c which stores a control operation program for the CPU 1b, and a RAM 1d into which data are temporally written and are read out therefrom when the CPU 1b performs control operations. The CPU 1b calculates a rotational angular speed $F_i$ for each of the tires of the front and rear wheels FW, RW at a specified sampling period ΔT (sec), for instance, each ΔT=1 second, based on the wheel speed pulse output from the wheel speed detecting means S. An alarm display 2 composed of liquid crystal display elements, plasma display elements or CRT for informing a tire Wi of which air-pressure is decreased and an initialization switch 3 which is operated by a driver upon exchanging tires or similar occasions are connected to the control unit 1.

In this embodiment, the apparatus includes a wheel speed detecting means for detecting wheel speeds of a front and a rear wheel of a two-wheeled vehicle; an acceleration calculating means for obtaining accelerations of a vehicle body of the two-wheeled vehicle upon defining the wheel speed of the front wheel, which is a following wheel, to be the vehicle body speed and differentiating the vehicle body speed with respect to the sampling time; a means for calculating slip rates (ratios of rotational numbers of the front and rear wheels) when the acceleration of the vehicle body is in a specified range which is proximate to zero; an average value calculating means for obtaining an average value of the slip rates and an average vehicle body speed in case the accelerations of the vehicle body have continued to be in the specified range which is proximate to zero for a specified period of time; a difference calculating means for obtaining differences between the average values of the slip rates and a reference value which is based on an average vehicle body speed as preliminarily set when an internal pressure is normal; and a means for judging decrease in internal pressure for judging that the internal pressure is decrease in case an average value of a specified number of the differences does not fall within a range of a preliminarily set threshold.

The program for judging decompression for use in a two-wheeled vehicle according to this embodiment is so arranged that the control unit 1 is made to function as the wheel speed detecting means for detecting wheel speeds of a front and a rear wheel of a two-wheeled vehicle; the acceleration calculating means for obtaining accelerations of a vehicle body of the two-wheeled vehicle; the slip rate calculating means for calculating slip rates when the acceleration of the vehicle body is in a specified range which is proximate to zero; the average value calculating means for obtaining an average value of the slip rates and an average vehicle body speed in case the accelerations of the vehicle body have continued to be in the specified range which is proximate to zero for a specified period of time; the difference calculating means for obtaining differences between the average values of the slip rates and a reference value which is based on an average vehicle body speed as preliminarily set when the internal pressure is normal; and the means for judging decrease in internal pressure for judging that the internal pressure is decrease in case an average value of a specified number of the differences does not fall within a range of a preliminarily set threshold.

The present invention relates to an apparatus for detecting decrease in internal pressure upon limiting running conditions.

There is limitedly used data that are obtained when the acceleration of the vehicle body is proximate to zero, that is, when running is performed at a constant speed.

When performing general running, there are many occasions, provided that such are short periods of time, in which the vehicle is performing running with the acceleration of the vehicle body being proximate to zero. Thus, an average slip rate and an average vehicle body speed are obtained in case the acceleration of the vehicle body has been proximate to zero for, e.g. 3 consecutive seconds.

A difference between the average slip rate and a reference value obtained on the basis of an average vehicle body speed as preliminarily obtained when the internal pressure is normal.

A specified number of such differences is accumulated and in case an average value thereof is not less than a specified value or not more than a specified value, it is determined that the internal pressure is decreased.

The reason for accumulating a specified number and averaging the same as performed in the present invention is that errors which are due to facts other than decreases in internal pressure shall be reduced in view of the following reasons.

Figure 3:
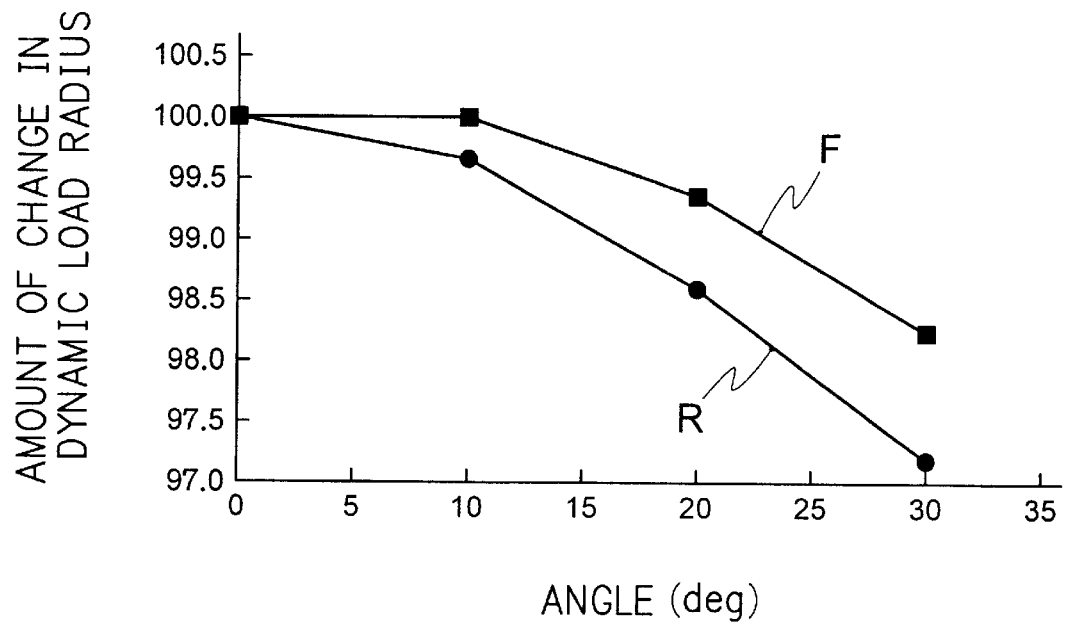
FIG. 3 is a view illustrating a relationship between angle and amount of change in the dynamic load radius of a tire.
Figure 4:
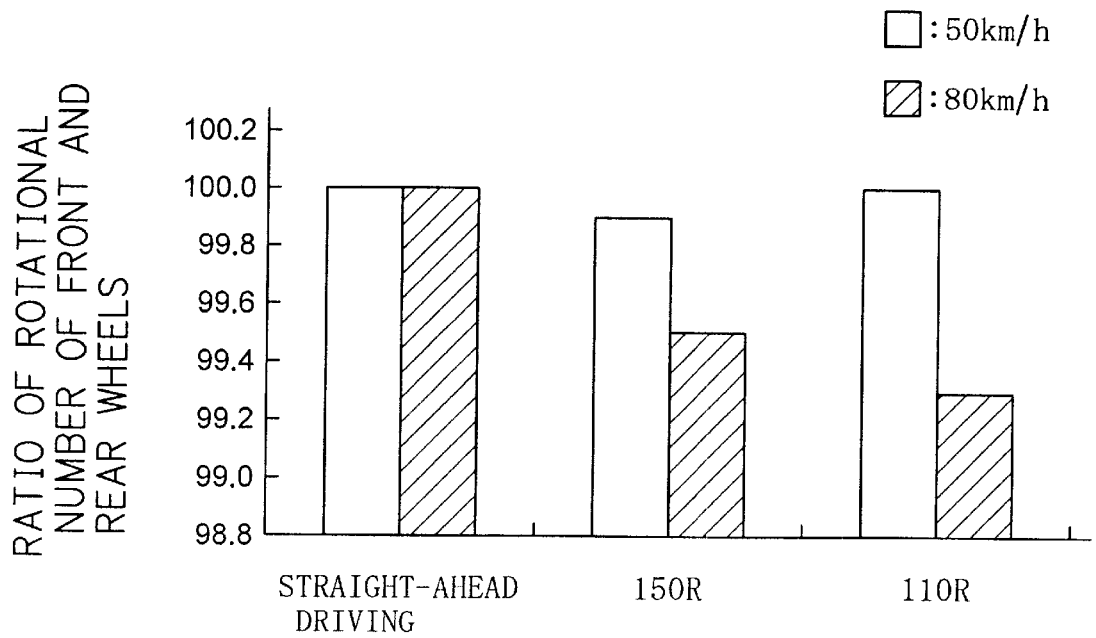
FIG. 4 is a view illustrating a relationship between straight-ahead driving as well as turning radius and ratio of rotational number of the front and rear wheels.

[1] When performing turning, a two-wheeled vehicle turns with the vehicle body being in an inclined condition. Further, profiles of the front wheel and the rear wheel differ from each other. Thus, in case of performing a test run in an experimental room with bias tires (available under the trade name of D103, manufactured by Sumitomo Rubber Industries,Ltd.) of normal pressure being mounted to the front wheel F and the rear wheel R, and of changing angles of the tires with respect to the ground surface in the range of 0 to 30 (degrees), dynamic load radiuses are varied upon performing running as illustrated in FIG. 3. Accordingly, when performing turning with the vehicle body in an inclined condition, the ratio of rotational numbers of the front and rear wheel is varied from that obtained when performing straight-ahead driving. When the angles are identical, it was found that the amount of change of the rear wheel R is larger than that of the front wheel F. More particularly, in case it is assumed that turning movements are performed with the front and rear wheels being at identical angles, it was found that the rotational number of the rear wheel is larger than that of the front wheel. The larger the inclination angle becomes, the larger the difference becomes, and it can be understood that the amount of change in the ratio of front and rear wheels becomes larger the more the vehicle body is inclined in performing turning movements. Results of test runs performed with an actual vehicle are illustrated in FIG. 4. FIG. 4 illustrates ratios of front and rear wheels when performing turning movements of 150R (turning radius of 150 m) and 110R (turning radius of 110 m) in case the ratio of front and rear wheels at the time of performing straight-ahead running at 50 km/h and 80 km/h is defined to be 100. In case of running at 50 km/h with the vehicle body being hardly inclined, the ratios of the front and rear wheels are hardly varied when compared to a straight-ahead running condition also when performing turning (150 R, 110 R), while the ratio of the front and rear wheels became smaller when performing turning at 80 km/h with the vehicle body being inclined. In this manner, it might be that the average slip ratios are varied depending on the turning conditions, irrespective of whether the internal pressure is normal. However, a turning condition resulting in a large change in the slip rate is a condition in which turning movements are made with the vehicle body being inclined, and it is deemed that such a running condition will rarely last for a long period of time. Thus, by taking an average value of a specified number, errors owing to turning movements might be reduced.

[2] When running uphill or downhill, influences of the gravitational acceleration will be added so that the ratios of the front and rear wheels are varied even when running at a constant speed. However, it is deemed that a hill of similar gradients hardly exists also in this case so that errors might similarly be reduced by performing averaging.

Operations of the apparatus for detecting decrease in air-pressure for use in a two-wheeled vehicle according to the present invention will now be explained on the basis of the following steps (1) to (8).

(1) Wheels speeds ($V1_n$, $V2_n$) are calculated on the basis of the rotational velocities of the front wheel FW and the rear wheel RW.

Wheel speed data of the tires of the respective wheels of an arbitrary point of time as obtained from a wheel speed sensor for generating rotational pulses by using an electromagnetic pickup or similar and for measuring the rotational velocities on the basis of the number of pulses are defined to be the wheels speeds $V1_n$, $V2_n$.

(2) Next, the wheel speed of the front wheel, which is the following wheel, is defined to be the vehicle body speed and by differentiating the vehicle body speed with respect to the sampling time, the acceleration of the vehicle body is obtained.

The acceleration of the wheel Afn is given by the following equation (1) on the basis of the last but one wheel speed Vfn−1 with respect to the wheel speed Vfn of the front wheel.

$$Afn=(Vfn-Vfn-1)/\Delta t/G \qquad (1)$$

Here, $\Delta t$ denotes a time interval (sampling time) between the wheel speeds Vfn and Vfn−1 as calculated from the wheel speed data, and G is the gravitational the acceleration.

(3) The slip rate (ratio of rotational numbers of the front and rear wheels) is calculated when the acceleration of the vehicle body is within a specified range proximate to zero, for instance, ±0.01 G.

When the rotational number of the front wheel is defined to be N1 while the rotational number of the rear wheel is defined to be N2, the slip rate S is given by N2/N1.

(4) When the acceleration has been within the above range for a specified period of time, for instance, three consecutive seconds, an average slip rate and an average vehicle body speed during this period are calculated.

(5) A difference D between the average slip rate and a reference value which is based on an average vehicle body speed which has been preliminarily obtained when the internal pressure was normal is obtained. While it is possible to preliminarily perform tests for obtaining and setting the reference value that corresponds to the average vehicle body speed, it is desirable that this is set when the initialization switch is pressed since variations in tire will be present and might cause large errors in practice. The initializing switch is pressed in case a tire has been exchanged or the internal pressure of a tire has been adjusted to be a reference internal pressure. When the initialization switch is pressed, reference values that correspond to various speeds are set.

Setting of the reference values is performed similar to the above steps (1) to (4), wherein average slip rates and average speeds are calculated when the values fell within the above range for three consecutive seconds, with ten of such values being accumulated for each speed whereupon average value thereof are stored as reference values.

(6) A specified number, for instance, ten of such differences D, are accumulated for obtaining an average value DOL thereof.

(7) When the average DOL does not fall in the range of a preliminarily set threshold, for instance, it is not less than an upper limit value of 0.8 or not more than a lower limit value of −0.6, it is determined that the internal pressure is decreased. The range for the threshold might be preliminarily set upon performing various decompression tests.

(8) The driver is then alarmed of the decrease in air-pressure.

While the present invention will now be explained on the basis of an example thereof, the present invention is not to be limited to this example only.

EXAMPLE

A two-wheeled vehicle (available under the trade name of ST 1100, Honda Mortor Co., Ltd.) with bias tires being mounted to front and rear wheels was provided. Test runs were respectively performed under conditions in which both of the front wheel tire and the rear wheel tire were at normal internal pressure S, in which only the front wheel tire was decompressed by 40% ($F_{40}$) and in which only the rear wheel tire was decompressed by 40% ($R_{40}$).

Figure 5:
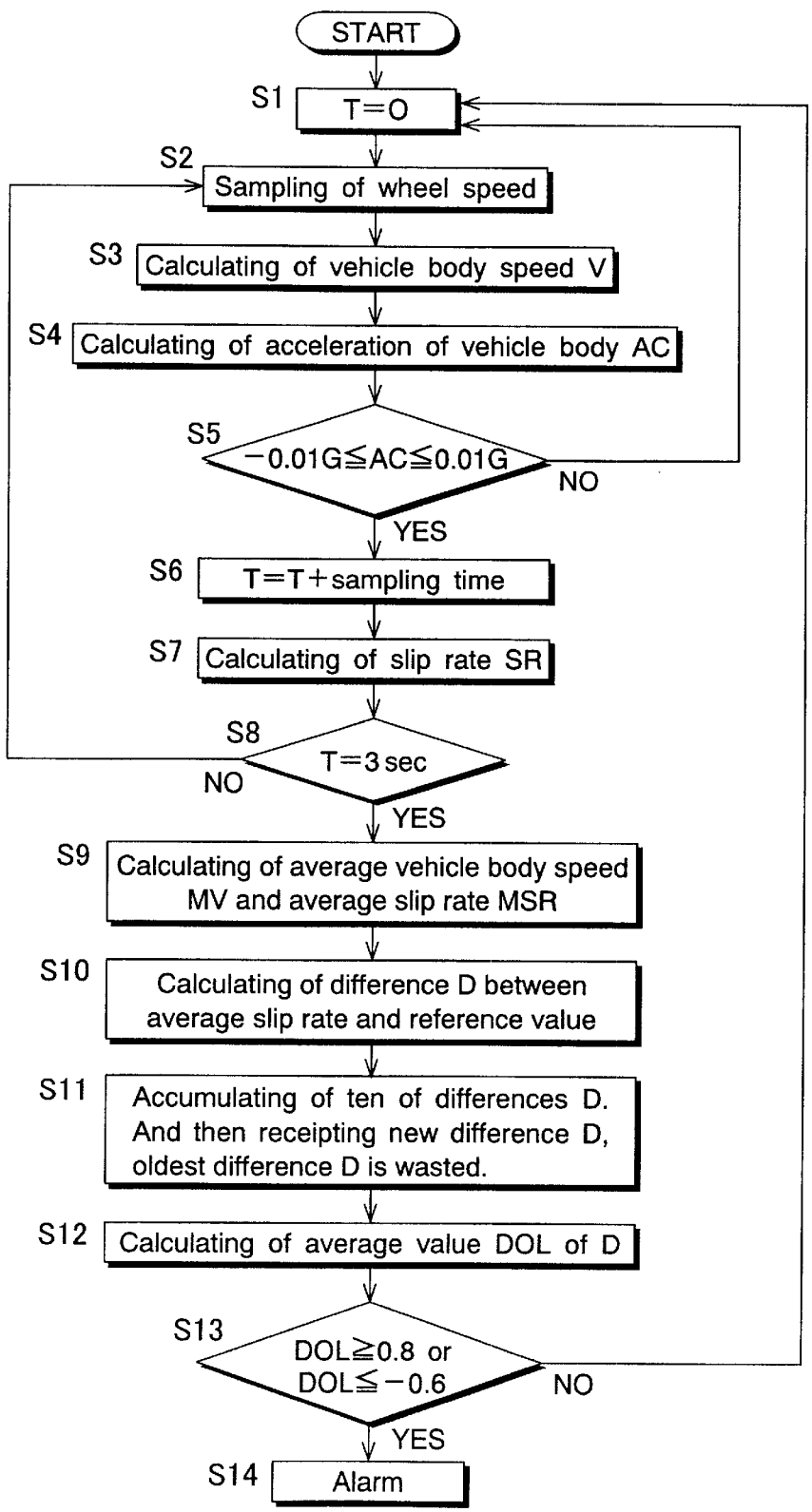
FIG. 5 is a flowchart of one embodiment of the present invention.

Next, as illustrated in FIG. 5, the wheel speed was obtained on the basis of wheel speed pulses which were output from the wheel speed sensor and a vehicle body speed V and an acceleration of the vehicle body AC were calculated every 40 ms (Steps S1 to S4).

It was then judged whether the acceleration of the vehicle body AC was within the range of ±0.01 G which is proximate to zero (Step S5), and if so, a slip rate SR was calculated (Step S6). This was repeated for three seconds, and an average slip rate MSR and an average vehicle body speed MV were calculated if the values were consecutively within the above range (Steps S8 to S9).

A difference D between the average slip rate and a reference value which is based on an average vehicle body speed which had been preliminarily obtained when the internal pressure was normal was then obtained (Step S10).

A specified number, for instance, ten of such differences D was accumulated for obtaining an average value DOL thereof. It should be noted that upon receipt of a new difference D, the oldest difference D was wasted (Step S11).

Upon calculating an average value DOL of the differences D (Step S12), it was determined whether this average value DOL was within the range of a preliminarily set threshold with an upper limit value of 0.8 and a lower limit value of −0.6 (Step S13).

Figure 6:
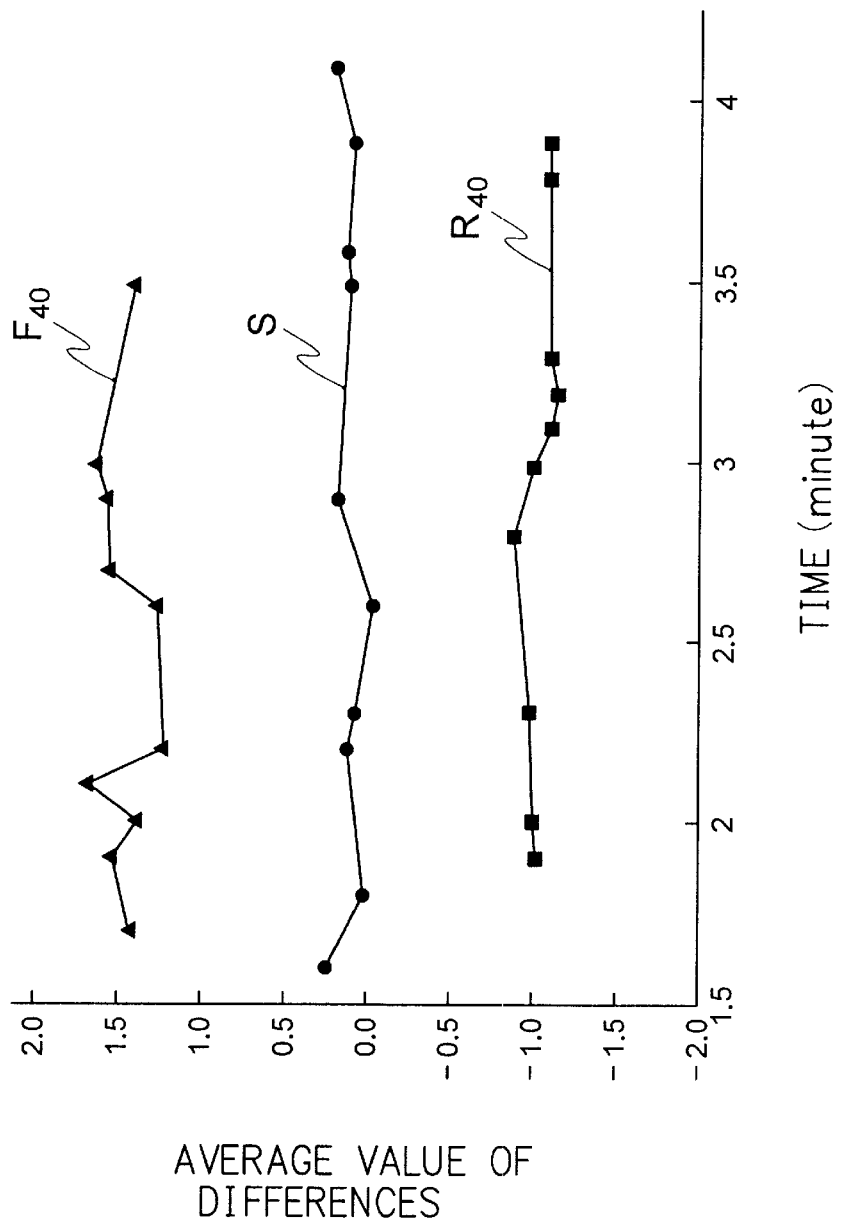
FIG. 6 is a view illustrating a relationship between time and average value of differences.

Time-varying changes in the average values DOL of the differences D for each of the cases in which both of the front wheel tire and the rear wheel tire were at normal internal pressure S, in which only the front wheel tire was decompressed by 40% ($F_{40}$) and in which only the rear wheel tire was decompressed by 40% ($R_{40}$) are illustrated in FIG. 6.

It can be understood therefrom that while the values of the average values DOL were continuously in the range around zero in case both of the front wheel tire and the rear wheel tire were at normal internal pressure S, such values were around 1.5 when only the front wheel tire was decompressed by 40% ($F_{40}$), and around −1.0 when only the rear wheel tire was decompressed by 40% ($R_{40}$).

Thus, when the average value DOL fell beyond of either of the limits, it is possible to judge that the internal pressure is decreased so as to issue an alarm for informing the driver (Step S14).

It can also be understood that the front wheel tire is decompressed in case the average value DOL is a positive value, while the rear wheel tire is decompressed in case it is a negative value.

As explained so far, according to the present invention, a decrease in air-pressure in a two-wheeled vehicle can be judged so as to enable safe driving.

What is claimed is:

1. An apparatus for detecting decrease in air-pressure for use in a two-wheeled vehicle, comprising: a wheel speed detecting means for detecting wheel speeds of a front and a rear wheel of a two-wheeled vehicle; an acceleration calculating means for obtaining accelerations of a vehicle body of the two-wheeled vehicle; a slip rate calculating means for calculating slip rates when the acceleration of the vehicle body is in a specified range which is proximate to zero; an average value calculating means for obtaining average values of the slip rates and average vehicle body speeds in case the accelerations of the vehicle body have continued to be in the specified range which is proximate to zero for a specified period of time; a difference calculating means for obtaining differences between the average values of the slip rates and a reference value which is based on an average vehicle body speed as preliminarily set when an internal pressure is normal; and a means for judging decrease in internal pressure for judging that the internal pressure is decrease in case an average value of a specified number of the differences does not fall within a range of a preliminarily set threshold.

2. A method for detecting decrease in air-pressure for use in a two-wheeled vehicle, comprising the steps of: detecting wheel speeds of a front and a rear wheel of a two-wheeled vehicle; obtaining accelerations of a vehicle body of the two-wheeled vehicle; calculating slip rates when the acceleration of the vehicle body is in a specified range which is proximate to zero; obtaining average values of the slip rates and average vehicle body speeds in case the accelerations of the vehicle body have continued to be in the specified range which is proximate to zero for a specified period of time; obtaining differences between the average values of the slip rates and a reference value which is based on an average vehicle body speed as preliminarily set when an internal pressure is normal; and judging that the internal pressure is decrease in case an average value of a specified number of the differences does not fall within a range of a preliminarily set threshold.

3. A program for judging decompression for use in a two-wheeled vehicle so arranged that a computer is made to function as a wheel speed detecting means for detecting wheel speeds of a front and a rear wheel of a two-wheeled vehicle; an acceleration calculating means for obtaining accelerations of a vehicle body of the two-wheeled vehicle; a slip rate calculating means for calculating slip rates when the acceleration of the vehicle body is in a specified range which is proximate to zero; an average value calculating means for obtaining average values of the slip rates and average vehicle body speeds in case the accelerations of the vehicle body have continued to be in the specified range which is proximate to zero for a specified period of time; a difference calculating means for obtaining differences between the average values of the slip rates and a reference value which is based on an average vehicle body speed as preliminarily set when an internal pressure is normal; and a means for determining decrease in internal pressure for judging that the internal pressure is decrease in case an average value of a specified number of the differences does not fall within a range of a preliminarily set threshold.

* * * * *